United States Patent
Ookita et al.

(10) Patent No.: US 12,465,553 B2
(45) Date of Patent: Nov. 11, 2025

(54) CAPSULE MARKING DEVICE AND METHOD

(71) Applicant: QUALICAPS CO., LTD., Yamatokoriyama (JP)

(72) Inventors: Kousuke Ookita, Yamatokoriyama (JP); Kazuaki Matsutani, Yamatokoriyama (JP); Junsuke Yasui, Yamatokoriyama (JP); Hiroshi Sakuramoto, Yamatokoriyama (JP)

(73) Assignee: QUALICAPS CO., LTD., Yamatokoriyama (JP)

( * ) Notice: Subject to any disclaimer, the term of this patent is extended or adjusted under 35 U.S.C. 154(b) by 219 days.

(21) Appl. No.: 18/260,613

(22) PCT Filed: Dec. 21, 2021

(86) PCT No.: PCT/JP2021/047188
§ 371 (c)(1),
(2) Date: Jul. 6, 2023

(87) PCT Pub. No.: WO2022/153796
PCT Pub. Date: Jul. 21, 2022

(65) Prior Publication Data
US 2024/0050318 A1    Feb. 15, 2024

(30) Foreign Application Priority Data

Jan. 15, 2021    (JP) .................................. 2021-004673

(51) Int. Cl.
*B23K 26/18*    (2006.01)
*A61J 3/00*    (2006.01)
(Continued)

(52) U.S. Cl.
CPC ............... *A61J 3/007* (2013.01); *B41J 2/442* (2013.01); *B41J 13/0009* (2013.01);
(Continued)

(58) Field of Classification Search
CPC .......... A61J 3/007; B23K 26/18; B29C 71/04; B29C 2793/007; B41F 17/36; B41J 2/442;
(Continued)

(56) References Cited

U.S. PATENT DOCUMENTS

| | | | |
|---|---|---|---|
| 2008/0158332 A1* | 7/2008 | Ackley | B41J 3/407 347/264 |
| 2013/0058550 A1* | 3/2013 | Tanimoto | G01N 21/9508 382/128 |
| 2024/0198656 A1* | 6/2024 | Bry | B41F 17/36 |

FOREIGN PATENT DOCUMENTS

JP    6402105 B2    10/2018

* cited by examiner

Primary Examiner — Leo B Tentoni
(74) Attorney, Agent, or Firm — Muncy, Geissler, Olds & Lowe, P.C.

(57) ABSTRACT

A capsule marking device 1 includes: a conveying unit 2 that conveys a capsule C along a conveyance path 2a; a first imaging unit 30 that captures an image of the capsule C being conveyed, to obtain first imaging data; a marking unit 40 that performs marking on the capsule C being conveyed; and a control unit that sets a marking region on the capsule C on the basis of the first imaging data, and forms a marking pattern in the marking region by controlling the operation of the marking unit 40. The capsule marking device 1 further includes a separating unit 60 that selectively separates the capsule C being conveyed from the conveyance path 2a, and the control unit controls the operation of the separating unit 60 to separate the capsule C having a seam with a size equal to or larger than a predetermined reference size in the marking region in the first imaging data without forming a marking pattern.

9 Claims, 4 Drawing Sheets

(51) Int. Cl.
*B29C 71/04* (2006.01)
*B41F 17/36* (2006.01)
*B41J 2/44* (2006.01)
*B41J 3/407* (2006.01)
*B41J 13/00* (2006.01)
*B41M 5/24* (2006.01)
*G01N 21/89* (2006.01)
*G01N 21/95* (2006.01)
*G01N 21/956* (2006.01)
*G06T 7/00* (2017.01)

(52) U.S. Cl.
CPC ... G01N 21/9508 (2013.01); G01N 21/95607 (2013.01); G06T 7/001 (2013.01); *A61J 2205/50* (2013.01); *B29C 2795/007* (2013.01); *G01N 2223/426* (2013.01); *G06T 2207/30128* (2013.01)

(58) Field of Classification Search
CPC ........ B41J 3/407; B41J 13/0009; B41M 5/24; G01N 21/89; G01N 21/9508; G01N 21/95607; G01N 2223/426; G06T 7/001; G06T 2207/30128
USPC .... 264/40.1, 129, 408, 482; 425/135, 174.4; 101/35, 36, 37, 38.1, 39, 40, 40.1; 347/110, 264; 348/86, 92, 129, 130; 356/394; 382/141
See application file for complete search history.

ABSTRACT# CAPSULE MARKING DEVICE AND METHOD

TECHNICAL FIELD

The present invention relates to a capsule marking device and a method, and more particularly, to a capsule marking device and a method suitable for marking edible capsules such as soft capsules or hard capsules.

BACKGROUND ART

There are known devices capable of marking capsules, like a configuration disclosed in Patent Literature 1, for example. Such a device includes: a conveying means that conveys an edible object such as a tablet or a capsule: a detecting means that captures an image of the edible object, to obtain direction data; a marking means that forms a marking pattern on the edible object; and a marking inspecting means that inspects the marking pattern formed on the edible object. This device can perform marking on the basis of the direction data of the edible object. Thus, in a case where the edible object is a tablet with a split line, marking can be performed along the split line so as not to cross the split line.

CITATION LIST

Patent Literature

Patent Literature 1: JP 6402105 B2

SUMMARY OF INVENTION

Technical Problem

Meanwhile, there are cases where a seam is present on the surface of an edible object in the form of a capsule. For example, a heat-sealed portion between coating films formed by a rotary method appears as a seam on a soft capsule. This seam does not always appear in the marking region like the split lines of tablets, and does not affect the visibility of the marking in a case where the seam does not overlap the marking region. However, in a case where the seam overlaps the marking region, it is difficult to perform marking while avoiding the seam, and there is a possibility that the visibility of the marking might become lower.

In view of this, the present invention aims to provide a capsule marking device and a method capable of efficiently performing marking with high visibility.

Solution to Problem

The objective of the present invention can be achieved with a capsule marking device that includes: a conveying unit that conveys a capsule along a conveyance path; a first imaging unit that captures an image of the capsule being conveyed, to obtain first imaging data; a marking unit that performs marking on the capsule being conveyed; and a control unit that sets a marking region on the capsule on the basis of the first imaging data, and forms a marking pattern in the marking region by controlling the operation of the marking unit. The capsule marking device further includes a separating unit that selectively separates the capsule being conveyed from the conveyance path, and the control unit controls the operation of the separating unit to separate the capsule having a seam with a size equal to or larger than a predetermined reference size in the marking region in the first imaging data without forming a marking pattern.

The capsule marking device preferably further includes a second imaging unit that captures an image of the capsule having the marking pattern formed thereon, to obtain second imaging data. When the size of the seam in the marking region in the first imaging data is smaller than the predetermined reference size, the control unit preferably discriminates the good or bad of the marking pattern on the basis of difference data between the first image data and the second image data.

The conveyance path is preferably formed in a linear shape, and the first imaging unit preferably includes: a camera that is disposed so that an imaging direction is orthogonal to the conveyance path; a reflective illuminating unit that is disposed on the same side of the conveyance path as the camera; and a transmissive illuminating unit that is disposed on the opposite side of the conveyance path from the camera. In this configuration, the reflective illuminating unit preferably includes: a ring light; a first polarizing plate that is disposed between the ring light and the conveyance path; and a second polarizing plate that is disposed between the camera and the conveyance path, and has a polarizing axis orthogonal to a polarizing axis of the first polarizing plate. In this configuration, the reflective illuminating unit preferably further includes a polarizing plate driving unit that moves the second polarizing plate.

The control unit preferably sets the marking region on the basis of the posture of the capsule specified by the contour of the capsule in the first imaging data.

The marking unit preferably performs marking by emitting $CO_2$ laser light.

The above objective of the present invention can also be achieved with a capsule marking method that includes: a first imaging step of capturing an image of a capsule being conveyed on a conveyance path with a first imaging unit to acquire first imaging data, and setting a marking region on the capsule on the basis of the first imaging data; a separating step of separating the capsule having a seam with a size equal to or larger than a predetermined reference size from the conveyance path, the seam being present in the marking region; and a marking step of forming a marking pattern in the marking region of the capsule that has been subjected to the separating step and is conveyed. In the marking step, when the size of the seam in the marking region in the first imaging data is smaller than the predetermined reference size, the marking pattern can be formed without overlapping the seam.

Advantageous Effects of Invention

According to the present invention, it is possible to provide a capsule marking device and a method capable of efficiently performing marking with high visibility.

DESCRIPTION OF EMBODIMENTS

Figure 1:
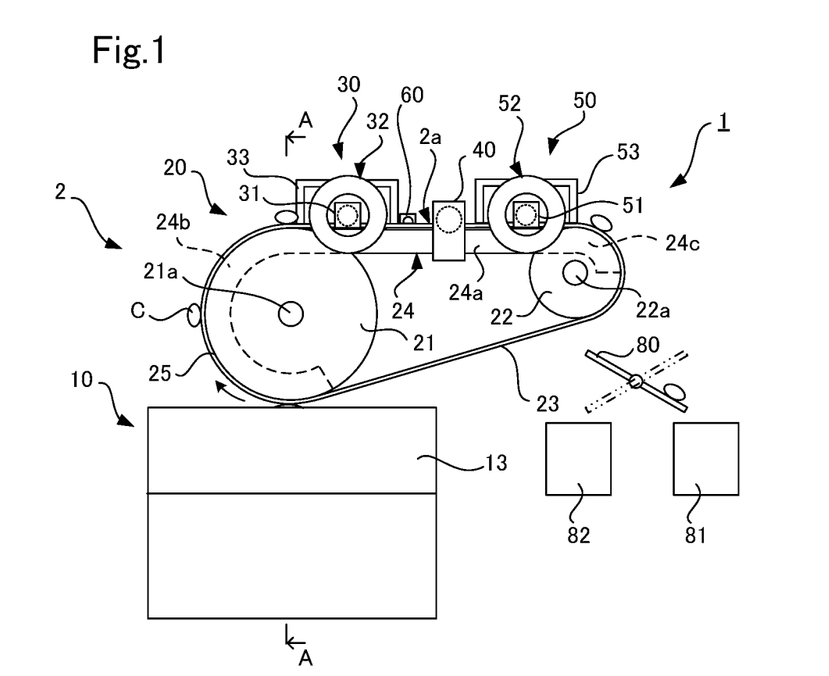
FIG. 1 is a schematic front view of a capsule marking device according to an embodiment of the present invention.

The following is a description of embodiments of the present invention, with reference to the accompanying drawings. FIG. 1 is a schematic front view of a capsule marking device according to an embodiment of the present invention. As shown in FIG. 1, a capsule marking device 1 includes a conveying unit 2, a first imaging unit 30, a marking unit 40, a second imaging unit 50, and a separating unit 60.

Figure 2:
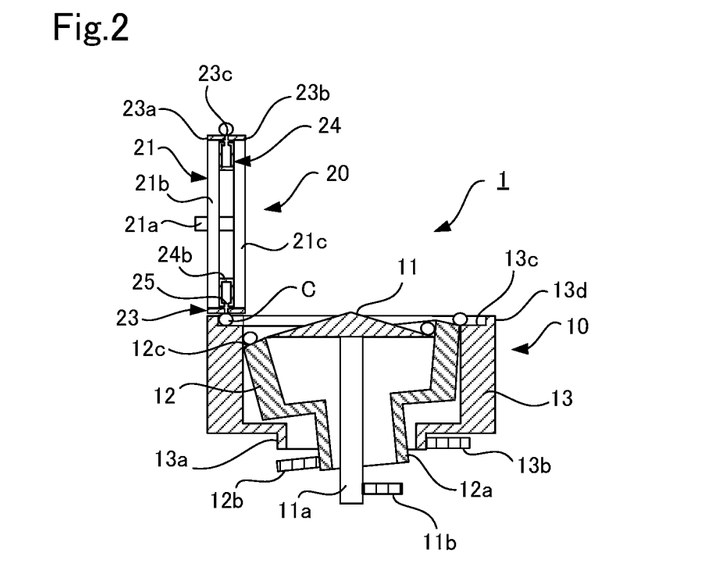
FIG. 2 is a cross-sectional view taken along the line A-A defined in FIG. 1.
Figures 3, 4:
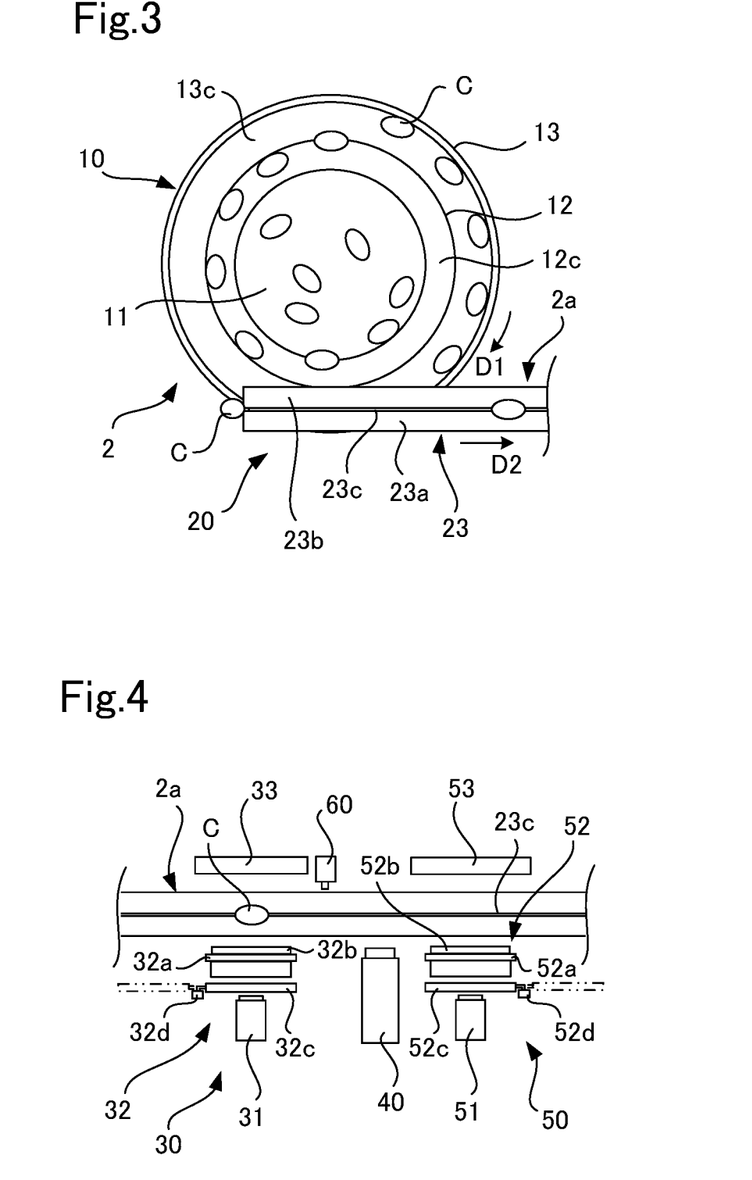
FIG. 3 is a plan view of a relevant portion of the capsule marking device shown in FIG. 1.
FIG. 4 is a plan view of another relevant portion of the capsule marking device shown in FIG. 1.

FIG. 2 is a cross-sectional view taken along the line A-A defined in FIG. 1. FIG. 3 is a plan view of a relevant portion of the conveying unit 2 shown in FIG. 1. As shown in FIGS. 1 to 3, the conveying unit 2 includes a first conveying device 10 and a second conveying device 20. The first conveying device 10 includes a shade-like disk 11, an intermediate ring 12 that accommodates the disk 11, and a rotating ring 13 that accommodates the intermediate ring 12.

While the rotating shafts 11a and 13a of the disk 11 and the rotating ring 13 extend in a vertical direction, the rotating shaft 12a of the intermediate ring 12 is disposed so as to be slightly tilted with respect to the rotating shafts 11a and 13a. The rotating shafts 11a, 12a, and 13a are connected to driving sources (not shown) such as motors individually provided via decelerators 11b, 12b, and 13b, respectively, and can rotationally drive the disk 11, the intermediate ring 12, and the rotating ring 13, independently of one another.

Conveyance surfaces 12c and 13c are circumferentially formed on the intermediate ring 12 and the rotating ring 13, respectively. The radially outer side of the conveyance surface 13c of the rotating ring 13 is covered with a ring-like protrusion 13d.

The second conveying device 20 includes: a first pulley 21 and a second pulley 22 that have the respective rotating shafts 21a and 22a disposed horizontally; an endless belt member 23 wound around the first pulley 21 and the second pulley 22; and a guide member 24 disposed in the conveying direction of the belt member 23. The diameter of the second pulley 22 is smaller than the diameter of the first pulley 21. The linear portion of the belt member 23 located between the first pulley 21 and the second pulley 22 is horizontally disposed above the first pulley 21 and the second pulley 22, to form a linear conveyance path 2a. On the other hand, the linear portion of the belt member 23 is tilted under the first pulley 21 and the second pulley 22.

As shown in FIG. 2, the first pulley 21 includes two circular plates 21b and 21c joined by the rotating shaft 21a, with a space being left between the two circular plates. Like the first pulley 21, the second pulley 22 also includes two circular plates joined by the rotating shaft 22a, with a space being left between the two circular plates. In this embodiment, the first pulley 21 is a driving pulley connected to a driving motor (not shown), and the second pulley 22 is a driven pulley. However, the first pulley 21 may be a driven pulley, and the second pulley 22 may be a driving pulley.

The belt member 23 includes two band-like conveying belts 23a and 23b, and the respective conveying belts 23a and 23b are wound around the respective circular plates 21b and 21c of the first pulley 21. Between the two conveying belts 23a and 23b, an opening 23c that is a narrow gap is formed over the entire circumference of the belt member 23. The conveying belts 23a and 23b can be formed with flat belts of a soft material such as silicone rubber, for example, but may be formed with V-belts, toothed belts, or the like.

As shown in FIG. 1, the guide member 24 includes: a linear portion 24a that is disposed immediately below the vicinity of the belt member 23 extending horizontally along the conveyance path 2a between the first pulley 21 and the second pulley 22; and arcuate portions 24b and 24c provided on both sides of the linear portion 24a in the conveying direction. Each of the arcuate portions 24b and 24c is inserted between the two circular plates of each corresponding one of the first pulley 21 and the second pulley 22, and is curved in an arcuate shape along the belt member 23 wound around the first pulley 21 and the second pulley 22.

As shown in FIG. 2, the guide member 24 is formed in a hollow cylindrical shape, and a slit-like suctioning portion 25 is formed along the opening 23c in a portion where the guide member 24 faces the opening 23c of the belt member 23. The inside of the guide member 24 can be decompressed by an operation of a vacuum pump (not shown), and a capsule C is attracted to the suctioning portion 25 via the opening 23c of the belt member 23, so that the capsule C attracted to the belt member 23 can be conveyed together with the belt member 23. The opening 23c of the belt member 23 of this embodiment is continuously formed between the two conveying belts 23a and 23b in the longitudinal direction. However, the belt member 23 may be formed as a single band-like belt, and openings having a circular shape, an elliptical shape, or a slit-like shape may be intermittently formed in the longitudinal direction of the band-like belt.

FIG. 4 is an enlarged plan view of a portion in the vicinity of the conveyance path 2a shown in FIG. 1. As shown in FIG. 4, the first imaging unit 30 includes a camera 31, a reflective illuminating unit 32, and a transmissive illuminating unit 33. The camera 31 is formed with a CCD area camera, a CCD line camera, or the like, is disposed so that the imaging direction becomes orthogonal to the conveyance path 2a in a plan view, and horizontally images a capsule C being conveyed on the conveyance path 2a along the upper surface of the belt member 23. The imaging direction of the camera 31 is preferably substantially parallel to the upper surface of the belt member 23. However, in a case where the lowermost portion of the capsule C is in the opening 23c of the belt member 23, imaging may be performed obliquely downward from above the belt member 23. As an example, the angle between the imaging direction of the camera 31 and the upper surface of the belt member 23 can be set within the range of 0 to 15 degrees.

The reflective illuminating unit 32 is disposed on the same side of the conveyance path 2a as the camera 31, and illuminates the capsule C with a white LED or the like from the same side as the camera 31. The reflective illuminating unit 32 of this embodiment includes a ring light 32a capable of uniformly illuminating the capsule C from the entire circumference, a first polarizing plate 32b, and a second polarizing plate 32c. The illuminating light of the ring light 32a may be infrared light or the like, other than visible light.

The first polarizing plate 32b is formed in a ring-like shape, is disposed in the vicinity of the ring light 32a, and is interposed between the ring light 32a and the conveyance path 2a, so that the capsule C is illuminated with linearly polarized light emitted from the ring light 32a. The second polarizing plate 32c is disposed in the vicinity of the camera 31 so as to cover the lens portion of the camera 31, and is interposed between the camera 31 and the conveyance path 2a, so that surface-reflected light from the capsule C passes therethrough and is observed by the camera 31. The second polarizing plate 32c is disposed so that the polarizing axis becomes orthogonal to the polarizing axis of the first polarizing plate 32b. The second polarizing plate 32c is designed to be movable with a polarizing plate driving unit 32d such as an actuator. As the driving axis of the polarizing plate driving unit 32d rotates, the second polarizing plate 32c can be retracted from the front of the camera 31 as indicated by a dash-dot-dot-dash line in FIG. 4. The polarizing plate driving unit 32d may be designed to linearly move the second polarizing plate 32c and retract the second polarizing plate 32c from the front of the camera 31.

The transmissive illuminating unit 33 is disposed on the opposite side of the conveyance path 2a from the camera 31, and illuminates the capsule C with a white LED or the like from the opposite side to the camera 31. The transmissive illuminating unit 33 of this embodiment is a surface light source in which a plurality of light emitting elements is arranged in a matrix. The illuminating light of the transmissive illuminating unit 33 may be infrared light or the like, other than visible light.

The marking unit 40 is a laser marking device, and can perform marking by laser-spot scanning the surface of the capsule C conveyed to a predetermined position and thus thermally denaturing the surface of the capsule C. The surface of the capsule C may contain discoloration inducing oxide such as titanium oxide, yellow ferric oxide, or red ferric oxide.

Examples of laser light of the marking unit 40 include solid laser light such as $YVO_4$ laser light, YLF laser light, and YAG laser light, gas laser light such as excimer laser light and $CO_2$ (carbon dioxide) laser light, and liquid laser light such as dye laser light. In particular, $CO_2$ laser light is easily absorbed by the surface of the capsule C, and has a low permeability with respect to the capsule C. Accordingly, $CO_2$ laser light can effectively act on the surface of the capsule C. Thus, even in a case where the capsule C is a transparent capsule, the surface can be denatured white, and clear marking can be performed.

The marking unit 40 is preferably capable of performing marking in accordance with the posture of the capsule C without moving or rotating the capsule C, by transforming coordinate data in a reference coordinate system into coordinate data in a machining coordinate system. Examples of such devices include an inkjet printing device and the like, as well as a laser marking device.

Like the first imaging unit 30, the second imaging unit 50 includes a camera 51, a reflective illuminating unit 52, and a transmissive illuminating unit 53. The reflective illuminating unit 52 includes a ring light 52a, a first polarizing plate 52b, a second polarizing plate 52c, and a polarizing plate driving unit 52d. The configurations and positions of the respective components of the second imaging unit 50 are similar to the configurations and positions of the respective components of the first imaging unit 30, and therefore, detailed explanation thereof is not made herein.

The separating unit 60 is disposed between the first imaging unit 30 and the marking unit 40 in the vicinity of the conveyance path 2a, and can selectively separate the capsule C from the conveyance path 2a by injecting compressed air to the capsule C being conveyed on the conveyance path 2a. The separating unit 60 is not limited to any particular configuration, and may be a pusher or the like that physically pushes the capsule C on the conveyance path 2a to separate the capsule C from the conveyance path 2a, for example.

The capsule C separated from the conveyance path 2a by the operation of the separating unit 60 falls directly or via a chuter (not shown) onto the first conveying device 10 disposed below the conveyance path 2a, and is conveyed again toward the conveyance path 2a.

Figure 5:
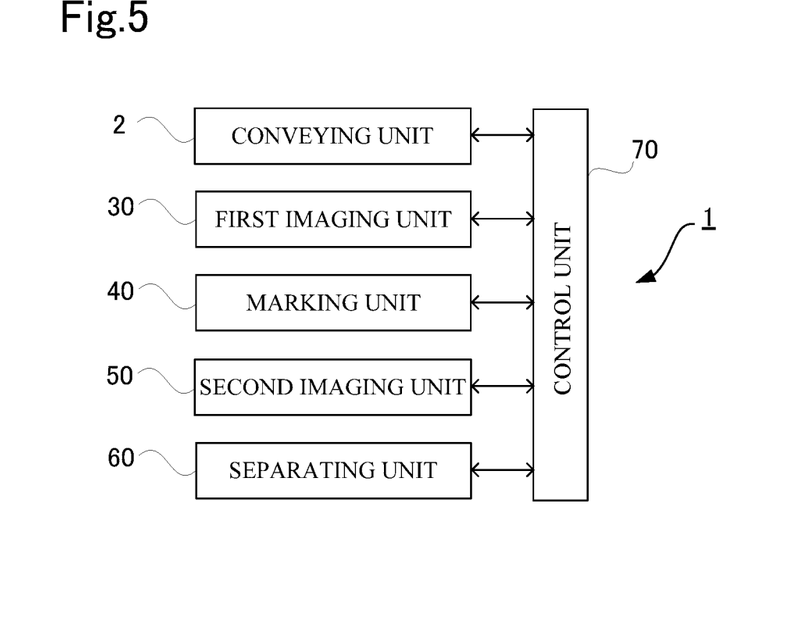
FIG. 5 is a block diagram of the capsule marking device shown in FIG. 1.

As shown in a block diagram in FIG. 5, operations of the conveying unit 2, the first imaging unit 30, the marking unit 40, the second imaging unit 50, and the separating unit 60 are controlled by a control unit 70.

Next, operations of the capsule marking device 1 having the above configuration are described. When a plurality of capsules C is supplied onto the disk 11 while the disk 11, the intermediate ring 12, and the rotating ring 13 of the first conveying device 10 of the conveying unit 2 are being rotationally driven in the same direction, the capsules C are subjected to centrifugal force, and move onto the conveyance surface 13c of the rotating ring 13 via the conveyance surface 12c of the intermediate ring 12. In this manner, the capsules C can be arranged in a line on the conveyance surface 13c, and these capsules C can be conveyed in the direction of rotation of the rotating ring 13 (the direction indicated by an arrow D1 in FIG. 3). The rotational speeds of the disk 11, the intermediate ring 12, and the rotating ring 13 are preferably set so that the rotational speed of the disk 11 becomes the lowest, and the rotational speed of the rotating ring 13 becomes the highest. In this manner, reliable aligned conveyance of the capsules C by the rotating ring 13 can be facilitated.

The first conveying device 10 is only required to align the capsules C on the conveyance surface 13c of the rotating ring 13 and convey the capsules C in the direction of rotation of the rotating ring 13. For example, without the intermediate ring 12 being provided, the respective rotating shafts of the disk 11 and the rotating ring 13 may be tilted with respect to each other, and the capsules C supplied onto the disk 11 may be directly moved onto the conveyance surface 13c of the rotating ring 13. The rotating shaft 13a of the rotating ring 13 is preferably disposed in the vertical direction as in this embodiment, but is only required to be disposed to extend in the vertical direction. For example, the rotating shaft 13a may be slightly tilted with respect to the vertical direction.

The capsules C aligned and conveyed toward the second conveying device 20 by the first conveying device 10 are sequentially attracted to the belt member 23 in the vicinity of a lower portion of the first pulley 21 by the suctioning portion 25, and are linearly conveyed in the direction indicated by an arrow D2 in FIG. 3 over the first pulley 21 and the second pulley 22, while remaining in the attracted state. In this manner, the capsules C aligned by the first conveying device 10 are conveyed along the linear conveyance path 2a, while being made to maintain the aligned state by the second conveying device 20.

At the position of transfer of the capsules C from the rotating ring 13 to the belt member 23, the direction of conveyance by the rotating ring 13 and the direction of conveyance by the belt member 23 are preferably the same as each other as in this embodiment. With such arrangement, the transfer of the capsules C can be reliably performed. Further, by making the speed of conveyance of the capsules C by the belt member 23 higher than the speed of conveyance of the capsules C by the rotating ring 13, it is possible to widen the alignment pitch of the capsules C being aligned and conveyed by the belt member 23.

When a capsule C being conveyed on the conveyance path 2a passes through the first imaging unit 30, a side surface of the capsule C is imaged, and thus, first imaging data is obtained. On the basis of the first imaging data, the control unit 70 sets a marking region on the capsule C. In this manner, a first imaging step is carried out on the capsule C.

Figure 6:
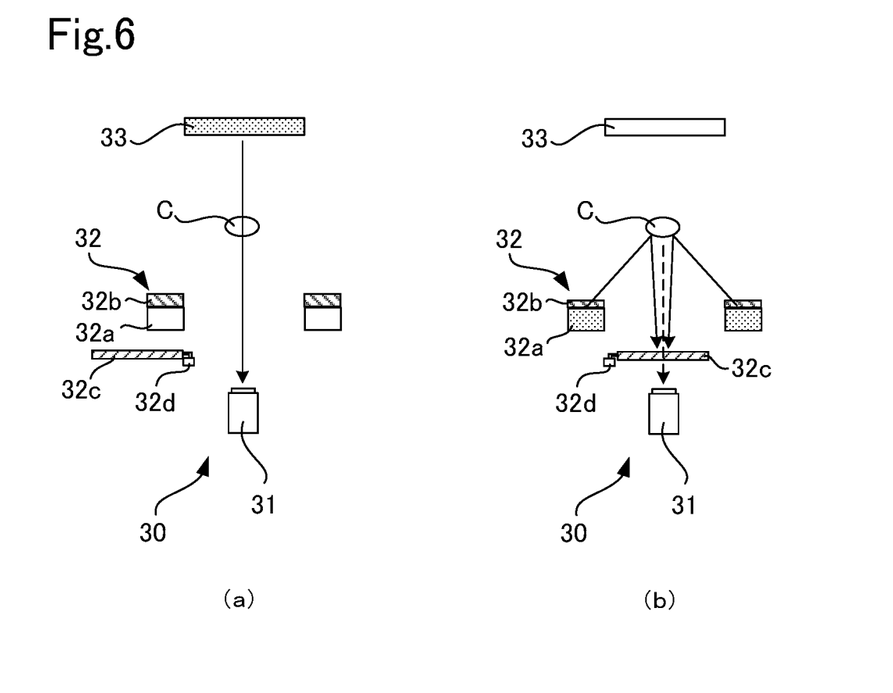
FIG. 6 is a diagram for explaining an operation of the capsule marking device shown in FIG. 1.

In a case where the capsule C is a colorless and transparent capsule, the control unit 70 turns on the transmissive illuminating unit 33 but turns off the reflective illuminating unit 32, and thus illuminates the capsule C with the transmissive illuminating unit 33, as shown in FIG. 6(a). Since part of the illuminating light of the transmissive illuminating unit 33 is transmitted through the capsule C and enters the camera 31, the contour of the capsule C appears in the first imaging data, and, in a case where a seam is present in the imaging range of the capsule C, the portion corresponding to the seam appears as a shadow. In a case where illumination is performed by the transmissive illuminating unit 33, to prevent a decrease in the quantity of illuminating light, it is preferable to operate the polarizing plate driving unit 32d and retract the second polarizing plate 32c from the front of the camera 31.

On the other hand, in a case where the capsule C is a colored transparent capsule or an opaque capsule, the control unit 70 turns on the reflective illuminating unit 32 but turns off the transmissive illuminating unit 33, and thus illuminates the capsule C with the reflective illuminating unit 32, as shown in FIG. 6(b). The illuminating light of the reflective illuminating unit 32 is turned into linearly polarized light by the first polarizing plate 32b, and illuminates the capsule C. The surface-reflected light from the capsule C then enters the camera 31 through the second polarizing plate 32c. Since the polarizing axis of the second polarizing plate 32c is orthogonal to the polarizing axis of the first polarizing plate 32b, reflection of illuminating light due to regular reflection light from the surface of the capsule C is removed, and only diffusely reflected light is observed by the camera 31. Accordingly, in a case where the capsule C is a colored transparent capsule in particular, it is possible to effectively reduce the glare on the surface of the capsule C, and obtain the first imaging data in which the contour and the seam of the capsule C are clear.

Which one of the reflective illumination by the reflective illuminating unit 32 and the transmissive illumination by the transmissive illuminating unit 33 is to be selected may be determined beforehand for each type of the capsules C through comparison between pieces of first imaging data obtained under the respective conditions. Alternatively, the illuminating light transmittance of a capsule C may be measured during the conveyance by the conveying unit 2, and the control unit 70 may automatically make selection on the basis of the measurement result.

Figure 7:
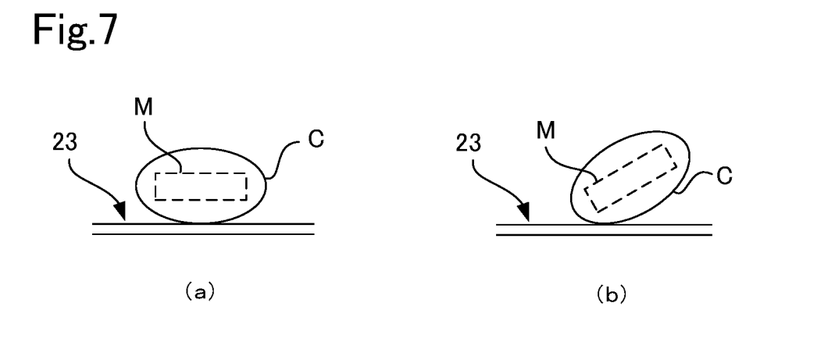
FIG. 7 is a diagram for explaining another operation of the capsule marking device shown in FIG. 1.

The setting of the marking region on a capsule C in first imaging data is performed on the basis of the posture of the capsule C being conveyed on the conveyance path 2a. As shown in FIG. 7(a), a capsule C on the belt member 23 is normally attracted to the belt member 23 in the most stable position, but, depending on the location where the capsule C is attracted, the capsule C might be attracted to the belt member 23 in a slightly upright position, as shown in FIG. 7(b). The control unit 70 can set a marking region M corresponding to the posture of the capsule C as shown in FIGS. 7(a) and 7(b), by storing beforehand the contours and the marking regions corresponding to various postures of capsules C and collating the contours included in the first imaging data. It is also possible to determine the marking region M on the capsule C by comparing the contour of the capsule C included in the first imaging data with a reference contour and calculating the angle of rotation with respect to the reference contour.

Figure 8:
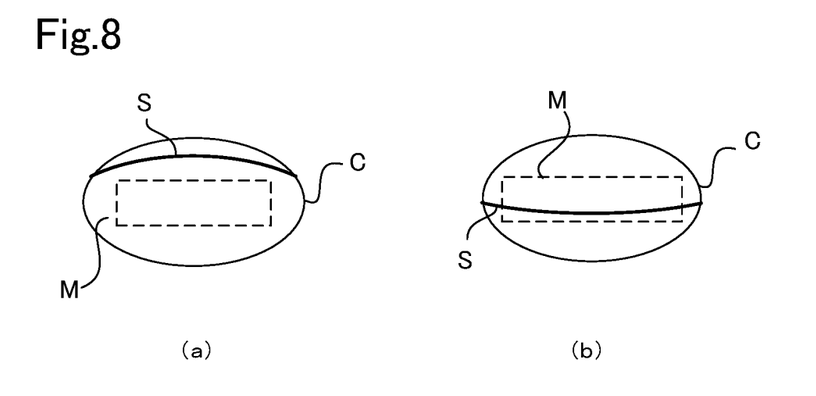
FIG. 8 is a diagram for explaining yet another operation of the capsule marking device shown in FIG. 1.

The control unit 70 determines whether a seam is present in the marking region M set in the first imaging data, and, if a seam is present, calculates the size of the seam. The position of a seam on the surface of a capsule C being conveyed on the conveyance path 2a is random. Therefore, in a case where a seam S does not overlap the marking region M as shown in FIG. 8(a), any marking defect problem does not occur. On the other hand, when the seam S overlaps the marking region M as shown in FIG. 8(b), visibility of marking might become lower.

In a case where the size of the seam in the marking region M is equal to or larger than a predetermined reference size that adversely affects the visibility of marking, the control unit 70 operates the separating unit 60 at the timing when the capsule C passes through the separating unit 60, to separate the capsule C from the conveyance path 2a. In this manner, the step of separating the capsule C is carried out. The capsule C separated from the conveyance path 2a falls onto the first conveying device 10, and is conveyed toward the conveyance path 2a, and the first imaging step is then performed again. The capsule C separated from the conveyance path 2a may be collected in a container or the like, or may be supplied to the first conveying device 10 after a certain amount of capsules C is stored. The size of the seam S in the marking region M can be the proportion of the area of the seam in the marking region M, for example. However, the length, the thickness, or the like of the seam present in the marking region M may be regarded as the size of the seam.

In a case where the size of the seam in the marking region M is smaller than the predetermined reference size, the control unit 70 causes the capsule C to pass without operating the separating unit 60, and performs marking at the timing when the capsule C is conveyed to the marking unit 40. In the marking unit 40, coordinate data in the reference coordinate system of a marking pattern formed with a character, a number, a symbol, a figure, or the like, or a combination thereof is stored beforehand in a memory. The control unit 70 transforms the coordinate data in the reference coordinate system into coordinate data in the machining coordinate system so that a marking pattern is formed along the marking region that has been set in accordance with the posture of the capsule C. The control unit 70 then performs drive control on the laser spot of the marking unit 40 in the machining coordinate system. In this manner, the step of marking on the capsule C is carried out. In a case where the coordinate data in the machining coordinate system can be rotated, shifted, or the like to avoid the seam present in the marking region M when a marking pattern is formed, it is possible to further reduce adverse influence of the seam on the visibility of the marking pattern by performing such marking (which is marking on a portion other than the seam in the marking region).

The capsule C on which marking has been performed is conveyed along the conveyance path 2a toward the second imaging unit 50. When the capsule C passes through the second imaging unit 50, the side surface including the marking region is imaged, and thus, second imaging data is obtained. On the basis of the second imaging data, the control unit 70 determines the quality of the marking pattern in the marking region. In this manner, a second imaging step is carried out on the capsule C. The illumination condition for the second imaging unit 50 is preferably the same as the illumination condition for the first imaging unit 30. In a case where reflective illumination is performed by the reflective illuminating unit 32 in the first imaging unit 30, reflective illumination is performed by the reflective illuminating unit 52 in the second imaging unit 50. In a case where transmissive illumination is performed by the transmissive illuminating unit 33 in the first imaging unit 30, on the other hand, reflective illumination is performed by the transmissive illuminating unit 53 in the second imaging unit 50.

In the control unit 70, reference pattern data corresponding to the marking pattern is stored beforehand in a memory unit. The control unit 70 determines the quality of the marking pattern by extracting the marking pattern data from the marking region in the second imaging data and comparing the marking pattern data with the reference pattern data.

In a case where there are no seams in the marking region, the quality of the marking pattern can be determined on the basis of the second imaging data as described above. However, there is a possibility that a seam of a smaller size than the predetermined reference size might exist in the marking region in the second imaging data. Therefore, the quality of the marking pattern may be determined on the basis of difference data between the first image data obtained by the first imaging unit 30 and the second image data obtained by the second imaging unit 50.

Figure 9:
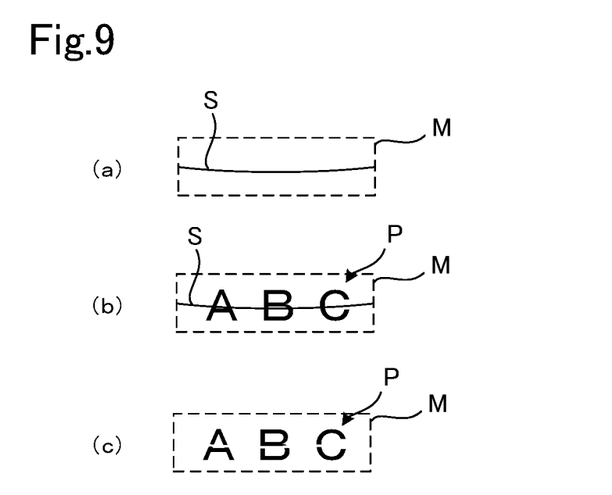
FIG. 9 is a diagram for explaining still another operation of the capsule marking device shown in FIG. 1.

For example, in a case where a seam S of a smaller size than the predetermined reference size is present in the marking region M in the first image data as shown in FIG. 9(a), the control unit 70 removes the marking region M in the first image data shown in FIG. 9(a) from the marking region M in the second image data shown in FIG. 9(b), to obtain the difference data of the marking region M shown in FIG. 9(c). In the difference data shown in FIG. 9(c), the portion corresponding to the seam S shown in FIG. 9(a) is missing from a marking pattern P. However, the size of the seam S is smaller than the predetermined reference size that does not adversely affect the visibility of the marking pattern P, and thus, the quality of the marking pattern P can be determined with high precision.

As shown in FIG. 1, the capsules C on which the marking pattern quality determination has been performed are sorted into a non-defective product box 81 and a defective product box 82 by the control unit 70 controlling the operation of a sorting damper 80.

With the capsule marking device 1 of this embodiment, in a case where the seam S of a capsule C overlaps the marking region M, a check is made to determine whether the seam S is equal to or larger in size than a predetermined reference size. In a case where the seam S is equal to or larger in size than the predetermined reference size, the capsule C can be separated from the conveyance path 2a without any marking pattern formed. Thus, marking with high visibility can be efficiently performed.

REFERENCE SIGNS LIST 1 capsule marking device
2 conveying unit
2a conveyance path
30 first imaging unit
40 marking unit
50 second imaging unit
60 separating unit
70 control unit
C capsule
S seam
M marking region

The invention claimed is:

1. A capsule marking device comprising:
a conveying unit that conveys a capsule along a conveyance path;
a first imaging unit that captures an image of the capsule being conveyed, to obtain first imaging data;
a marking unit that performs marking on the capsule being conveyed; and
a control unit that sets a marking region on the capsule on a basis of the first imaging data, and forms a marking pattern in the marking region by controlling an operation of the marking unit,
the capsule marking device further comprising a separating unit that selectively separates the capsule being conveyed from the conveyance path,
wherein the control unit controls an operation of the separating unit, to separate a capsule having a seam with a size equal to or larger than a predetermined reference size in the marking region in the first imaging data without forming a marking pattern.

2. The capsule marking device according to claim 1, further comprising a second imaging unit that captures an image of the capsule on which the marking pattern has been formed, to obtain second imaging data,
wherein when the size of the seam in the marking region in the first imaging data is smaller than the predetermined reference size, the control unit discriminates the good or bad of the marking pattern on a basis of difference data between the first image data and the second image data.

3. The capsule marking device according to claim 1, wherein
the conveyance path is formed in a linear shape, and
the first imaging unit includes: a camera that is disposed so that an imaging direction is orthogonal to the conveyance path; a reflective illuminating unit that is disposed on a same side of the conveyance path as the camera; and a transmissive illuminating unit that is disposed on an opposite side of the conveyance path from the camera.

4. A capsule marking device comprising:
a conveying unit that conveys a capsule along a conveyance path;
a first imaging unit that captures an image of the capsule being conveyed, to obtain first imaging data;
a marking unit that performs marking on the capsule being conveyed; and
a control unit that sets a marking region on the capsule on a basis of the first imaging data, and forms a marking pattern in the marking region by controlling an operation of the marking unit,
the capsule marking device further comprising a separating unit that selectively separates the capsule being conveyed from the conveyance path, wherein
the control unit controls an operation of the separating unit, to separate a capsule having a seam with a size equal to or larger than a predetermined reference size in the marking region in the first imaging data without forming a marking pattern,
the conveyance path is formed in a linear shape,
the first imaging unit includes:
a camera that is disposed so that an imaging direction is orthogonal to the conveyance path;
a reflective illuminating unit that is disposed on a same side of the conveyance path as the camera; and a transmissive illuminating unit that is disposed on an opposite side of the conveyance path from the camera, and the reflective illuminating unit includes: a ring light; a first polarizing plate that is disposed between the ring light and the conveyance path; and a second polarizing plate that is disposed between the camera and the conveyance path, and has a polarizing axis orthogonal to a polarizing axis of the first polarizing plate.

5. The capsule marking device according to claim 4, wherein the reflective illuminating unit further includes a polarizing plate driving unit that moves the second polarizing plate.

6. The capsule marking device according to claim 1, wherein the control unit sets the marking region on a basis of a posture of the capsule specified by a contour of the capsule in the first imaging data.

7. The capsule marking device according to claim 1, wherein the marking unit performs marking by emitting a $CO_2$ laser.

8. A capsule marking method comprising:
a first imaging step of capturing an image of a capsule being conveyed on a conveyance path with a first imaging unit to acquire first imaging data, and setting a marking region on the capsule on a basis of the first imaging data;
a separating step of separating a capsule having a seam with a size equal to or larger than a predetermined reference size from the conveyance path, the seam being present in the marking region; and
a marking step of forming a marking pattern in the marking region of the capsule that has been subjected to the separating step and is conveyed.

9. The capsule marking method according to claim 8, wherein, in the marking step, when the size of the seam in the marking region in the first imaging data is smaller than the predetermined reference size, the marking pattern is formed without overlapping the seam.

* * * * *